No. 877,864. PATENTED JAN. 28, 1908.
F. L. RICHARDSON.
GAGE FOR SHOEMAKERS' USE.
APPLICATION FILED SEPT. 21, 1907.
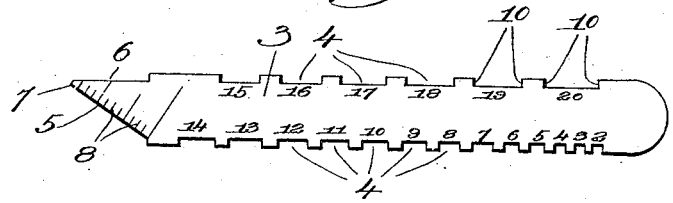
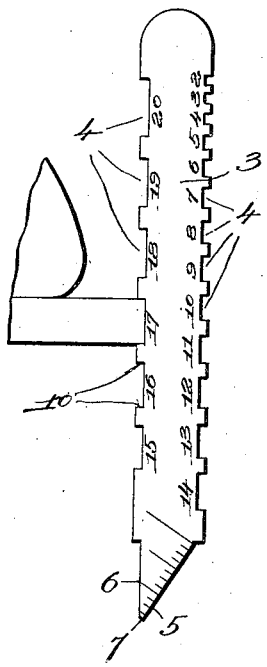
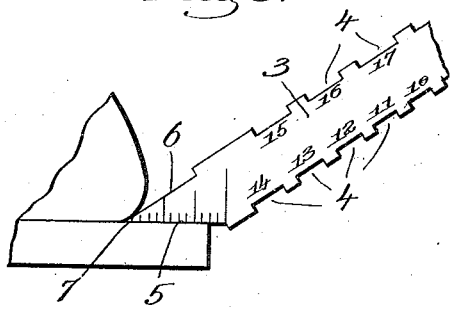
Witnesses:
Inventor.
Fred L. Richardson,
by Crosby Gregory
attys.
THE NORRIS PETERS CO., WASHINGTON, D. C.

UNITED STATES PATENT OFFICE.

FRED L. RICHARDSON, OF ROCKLAND, MASSACHUSETTS, ASSIGNOR OF ONE-HALF TO WILLIAM F. BROCK, OF ABINGTON, MASSACHUSETTS.

GAGE FOR SHOEMAKERS' USE.

No. 877,864.

Specification of Letters Patent.

Patented Jan. 28, 1908.

Application filed September 21, 1907. Serial No. 393,885.

*To all whom it may concern:*

Be it known that I, FRED L. RICHARDSON, a citizen of the United States, and a resident of Rockland, in the county of Plymouth and State of Massachusetts, have invented an Improvement in Gages for Shoemakers' Use, of which the following description, in connection with the accompanying drawing, is a specification, like letters on the drawing representing like parts.

This invention relates to a gage for shoemakers' use, and has for its special object to provide a novel gage which is especially designed for measuring the thickness of the sole and also for measuring the width of the sole extension.

The special features wherein my invention resides will be more particularly pointed out in the claims.

In the drawings, Figure 1 shows my improved gage; Fig. 2 shows the gage used for measuring the thickness of the sole; Fig. 3 shows the manner of using the gage for measuring the width of the sole extension.

The gage is designated by 3 and it is provided on opposite edges with recesses or notches 4 of different widths. Each recess has the two opposed parallel sides 10 extending perpendicularly to the edge of the gage and between which the edge of the sole may be placed, as shown in Fig. 2. Said gage may have imprinted thereon suitable numbers or characters by which the person using the gage can distinguish between the different recesses. One end of the gage is pointed in shape, said pointed end having the inclined edge 5 which extends at an inclination to the length of the gage and which meet the edge 6 in a comparatively sharp point 7. The edge 6 stands substantially parallel to the length of the gage. The edge 5 is provided with graduation marks 8 and these are preferably arranged to indicate inches and fractions of an inch.

In measuring the thickness of the sole of a shoe either during the process of manufacturing the shoe or after it is manufactured the gage is used as shown in Fig. 2, that is, the edge of the sole is placed between the sides 10 of that notch 4 which corresponds in width to the thickness of the sole, and by reading the notation or number adjacent said notch, the manufacturer or operator can determine the proper thickness of the sole. For measuring the width of the sole extension, the gage is used as shown in Fig. 3 with the graduated edge 5 placed on top of the sole and with the point 7 inserted in the crease. By means of a gage of this construction the correct width of the sole extension from the crease can be accurately determined because the shape of the end of the gage is such as to permit the point 7 to engage the bottom of the crease without striking the upper. It is now quite the common practice to measure the width of a sole extension by means of an ordinary steel scale, but it is impossible to get the correct measurement of the sole extension with such an implement because the shape of the ordinary steel scale is such as to prevent the zero point thereof from being inserted into the crease of the shoe. My improved gage, however, permits a proper and correct measurement of the sole extension to be made. The device thus combines in one instrument a measure for determining the thickness of the sole and the width of the sole extension.

Having fully described my invention, what I claim as new and desire to secure by Letters Patent is:—

A gage having on its opposite edges notches of different widths for measuring the thickness of the sole, each notch having parallel opposed sides, said gage also having one end provided with two converging edges 5, 6, which meet in the comparatively sharp point 7, the edge 5 being provided with graduations for measuring the width of the sole extension.

In testimony whereof, I have signed my name to this specification, in the presence of two subscribing witnesses.

FRED L. RICHARDSON.

Witnesses:
 WM. F. BROCK,
 JOHN C. EDWARDS.